(12) United States Patent
Vey et al.

(10) Patent No.: US 7,014,886 B2
(45) Date of Patent: Mar. 21, 2006

(54) TUFT AND FILAMENT BINDING IN UNFINISHED CARPET

(75) Inventors: Marlies Vey, Marl (DE); Hans Günther Wey, Mülheim (DE)

(73) Assignee: Degussa AG, Duesseldorf (DE)

( * ) Notice: Subject to any disclaimer, the term of this patent is extended or adjusted under 35 U.S.C. 154(b) by 51 days.

(21) Appl. No.: 10/602,651

(22) Filed: Jun. 25, 2003

(65) Prior Publication Data

US 2004/0052952 A1 Mar. 18, 2004

(30) Foreign Application Priority Data

Jun. 26, 2002 (DE) .......................... 102 28 622

(51) Int. Cl.
*B05D 3/02* (2006.01)

(52) U.S. Cl. .................................. 427/389.9
(58) Field of Classification Search ................ 427/389.9
See application file for complete search history.

(56) References Cited

U.S. PATENT DOCUMENTS

| 3,583,936 A | | 6/1971 | Stahl |
| 4,309,522 A | | 1/1982 | Dietrich et al. |
| 5,047,462 A | | 9/1991 | Kehr et al. |
| 5,241,014 A | * | 8/1993 | Kehr et al. .................. 525/376 |

FOREIGN PATENT DOCUMENTS

| DE | 1 959 141 | | 6/1971 |
| DE | 23 06 667 | | 9/1974 |
| DE | 26 10 141 | | 9/1977 |
| DE | 29 30 108 | | 11/1982 |
| EP | 0 309 674 | | 4/1989 |
| EP | 0 518 014 | | 12/1992 |
| GB | 1 155 786 | | 6/1969 |
| GB | 1 449 316 | | 9/1976 |
| JP | 55-152630 | * | 11/1980 |
| JP | 10-276888 | * | 10/1998 |
| WO | WO 99/40160 | * | 8/1999 |

OTHER PUBLICATIONS

Translation of EP 518014, Dec. 1992.*
Translation of JP 55–152630, Nov. 1980.*
Wey et al, Revista de Plasticos Modernos, 72(486), pp 606–613, 1996.*
Wey et al, Adhaesion–Kleben & Dichten, 40(12), pp 16, 18–21, 1996.*
Dickert et al, Defensive Publication, T 900016, Jul. 1972.*

* cited by examiner

*Primary Examiner*—Erma Cameron
(74) *Attorney, Agent, or Firm*—Oblon, Spivak, McClelland, Maier & Neustadt, P.C.

(57) ABSTRACT

A process for tuft and filament bonding of unfinished carpet includes applying a coating composition which contains from 50% to 100% by weight of a substantially amorphous poly-α-olefin as a melt to the backside of a carpet material so as to obtain a coating weight of from 20 to 1,500 g/m², the melt viscosity of the coating composition at 190° C. is in the range from 400 mPas to 10,000 mPas.

18 Claims, No Drawings

TUFT AND FILAMENT BINDING IN UNFINISHED CARPET

BACKGROUND OF THE INVENTION

1. Field of the Invention

This invention relates to a process for tuft and filament binding in unfinished carpet using hotmelts based on amorphous poly-α-olefins and bonded materials produced by the process.

2. Discussion of the Background

Pile threads and pile loops of unfinished carpet have hitherto been typically attached using carboxylated SBR latex filled with different amounts of chalk. In this process, the water has to be evaporated from the latex after application. This takes place, at appreciable expense in terms of time and energy, in drying ducts up to 40 m in length. An additional operation is then necessary to apply a further coat to the backside of the carpet. This can be for example a bituminous composition, a polyurethane foam or, as described in EP-A-0 309 674, a heavy-duty coating composition. Carpets of this kind, wherein tuft and filament bonding is effected by means of the abovementioned latices, however, are difficult to recycle.

DE-A-26 10 141 discloses tufted carpets where the backing material is given a subfacial coating of an atactic poly-α-olefin before use. The punching through of the pile yarn is followed by a hot fixing step. Owing to resistance due to the coating, however, the pile yarn is difficult to punch through, and there is also a risk that coating residues will adhere to the needle and interfere with its ability to punch through the backing. Moreover, this technique only allows for tuft bonding and not for single filament bonding. For these reasons, the process has not been implemented to date.

DE-A-19 59 141 discloses a carpet backsized with a composition comprising ethylene copolymer, wax and appreciable amounts of a resin mixture. However, the ethylene-vinyl acetate copolymer which is primarily used in this reference leads to appreciable odor problems during use. The resins used are costly; furthermore, the composition has a very low softening point and hence a very low heat resistance. The same is true of the composition described in GB 1 155 786.

EP-A-0 518 014 discloses three-dimensionally formable, recyclable floor carpets having a backcoating containing a poly-α-olefin. However, the backcoating contains appreciable amounts of isotactic polypropylene and filler and therefore is very viscous in the molten state. The backcoating is applied in a sufficiently thick layer for the floor carpet to be permanently three-dimensionally formed, but it has been determined that such a coating composition does not provide tuft and filament bonding.

SUMMARY OF THE INVENTION

Accordingly, it is an object of the present invention to provide a method for simple and effective tuft and filament binding in unfinished carpet without the disadvantages associated with the use of latex.

DESCRIPTION OF THE PREFERRED EMBODIMENTS

This object is achieved by a process which comprises applying a melt of the following composition uniformly to the backside of the unfinished carpet material so as to obtain a coating weight from 20 to 1,500 g/m$^2$, preferably from 50 to 1,000 g/m$^2$ and more preferably from 60 to 800 g/m$^2$. The composition comprises:

a) from 50% to 100% by weight of substantially amorphous poly-α-olefin,
b) from 0% to 5% by weight of crystalline polyolefin,
c) from 0% to 40% by weight of resin,
d) from 0% to 35% by weight of fillers or pigments,
e) from 0% to 10% by weight of flame retardant (other than magnesium hydroxide and aluminum hydroxide) and/or
f) from 0% to 15% by weight of wax.

The melt viscosity of the composition measured at 190° C. in a rotary viscometer as per DIN 53019, is in the range from 200 mPas to 20,000 mPas, preferably in the range from 400 mPas to 10,000 mPas, more preferably in the range from 500 to 8,000 mPas and even more preferably in the range from 600 to 6,000 mPas.

The substantially amorphous poly-α-olefin can be one in particular having a monomer composition that includes from 0% to 100% by weight and preferably from 0% to 80% by weight of a poly-α-olefin having 4 to 10 carbon atoms, from 0% to 100% by weight and preferably from 20% to 100% by weight of propene, and from 0% to 20% by weight of ethene.

Examples of preferred amorphous poly-α-olefins include atactic polypropylene (APP), atactic poly-1-butene, propene-ethene copolymers, propene-1-butene copolymers, 1-butene-ethene copolymers and propene-1-butene-ethene terpolymers. It will be appreciated that mixtures of various poly-α-olefins can be used as well.

A preferred embodiment utilizes a substantially amorphous poly-α-olefin having a softening point (ring and ball method as per DIN EN 1427) between 70 and 165° C., a melt viscosity (to DIN 53019) at 190° C. between 2,000 and 200,000 mPas, a density of less than 0.90 g/cm$^3$ and a 100/25/5 needle penetration as per DIN EN 1426 between 3 and 50×0.1 mm. Appropriate polymers can be prepared by controlled polymerization over conventional Ziegler catalysts or modified catalysts derived therefrom, as described for example in DE-C 23 06 667 or DE-C 29 30 108. Those portions of which are relevant to the production and use of catalysts are incorporated herein by reference.

The crystalline fraction of the substantially amorphous poly-αolefin may be estimated for example by determining the enthalpy of fusion by means of the DSC method. Here, a weighed sample is first heated from −100° C. to +210° C. at a heating rate of 10° C./min and then cooled back down again to −100° C. at a rate of 10° C./min. After the thermal history of the sample has been eliminated in this manner, it is once again heated at a rate of 10° C./min to 210° C. and the melting peak which is attributable to the crystallite melting point $T_m$ is integrated to determine the enthalpy of fusion of the sample. For the purposes of this invention, the enthalpy of fusion of the substantially amorphous poly-α-olefin is not more than 100 J/g, preferably not more than 60 J/g and more preferably not more than 40 J/g. The lower limit for the enthalpy of fusion is 0 J/g, preferably 2 J/g and more preferably 4 J/g.

The substantially amorphous poly-α-olefin content of the coating composition is preferably in the range from 60% to 98% by weight and more preferably in the range from 70% to 96% by weight.

The crystalline polyolefin b) is generally an isotactic polypropylene or an isotactic poly-1-butene. Not only homopolymers but also copolymers can be used, for example propene-1-butene copolymers, ethene-propene random copolymers or ethene-propene block copolymers. When such a polyolefin is used, the fraction of the coating composition which is attributable to it is preferably not less than about 0.1% by weight. T The resin c) is for example a natural or synthetic terpene resin, a modified terpene resin, a rosin, a cumarone-indene resin, an aliphatic, aliphatic-aromatic or aromatically modified hydrocarbon resin, a liquid resin, a hydrogenated cyclic hydrocarbon resin or an ester resin such as for example a fully or partly hydrogenated rosin glyceryl ester resin or a hydrogenated pentaerythritol ester of a rosin. Any resin which is fully or partially compatible with poly-α-olefins may be used. Compatible means miscible with the poly-α-olefin at the ratio used.

The resin content of the coating composition is preferably not more than 30% by weight and more preferably not more than 25% by weight and preferably not less than about 0.1% by weight, more preferably not less than 2% by weight and even more preferably not less than 5% by weight.

The fillers or pigments d) are for example carbon black, calcium carbonate, barium sulfate, aluminum oxide, aluminum hydroxide and magnesium hydroxide (which may each also act as a flame retardant), graphite, inorganic or organic color pigments or white pigments. The amount they are used in is preferably not more than 20% by weight and more preferably not more than 15% by weight and preferably not less than about 0.05% by weight, more preferably not less than 0.3% by weight and even more preferably not less than 1% by weight.

The flame retardant e) can be any customary flame retardant for polyolefin molding compositions. Brominated or phosphorus-containing flame retardants are especially suitable. The flame retardant content of the coating composition is preferably not more than 6% by weight and preferably not less than about 0.1% by weight.

The wax f) can be any customary polyethylene wax or polypropylene wax, for example Fischer-Tropsch waxes or polyethylene paraffins as obtained either by polymerization of ethylene or by degradation of higher molecular weight polyethylenes, fully refined waxes or microcrystalline petroleum paraffins. The wax content of the coating composition is preferably not more than 10% by weight and more preferably not more than 7% by weight and preferably not less than about 0.1% by weight.

To meet specific performance requirements, the coating composition may additionally contain a total of not more than 20% by weight and preferably a total of not more than 15% by weight of other additives such as for example ethylene-vinyl acetate copolymer, polyisobutene, rubber (EPM, EPDM, SEBS), mineral oil, stabilizers and/or antistats.

The softening point of the coating composition, measured using the ring and ball method, is preferably not less than 80° C., more preferably not less than 85° C. and even more preferably not less than 90° C. and preferably not more than 165° C., more preferably not more than 150° C. and even more preferably not more than 140° C.

The coating composition may be applied to the backside of unfinished carpet material (for example tufted carpet, needlefelt or cut pile carpet) for example by doctor coating, spray coating, roller coating or using a wide slot die. The coating temperature is above the softening temperature of the coating composition and is generally in the range from 100 to 190° C.; it obviously also depends on the material of the carpet to be coated. In the case of a carpet composed of polypropylene fiber or natural fiber, it is particularly advantageous to operate at a coating temperature of from 150 to 180° C., whereas carpet material which has a higher melting point, for example PA66, in principle also permits coating temperatures of more than 190° C. Solutions containing the coating composition in a dissolved state may be applied at temperatures lower than 100° C., then dried at higher temperatures.

The carpet may be preheated, for example by means of IR radiators, before the coating composition is applied. In most cases, heating with a further IR radiator is sensible after the coating composition has been applied, in order that the hot coating composition may better penetrate into the loops.

The coating weight required is especially dependent on the thickness of the tufts, in that thick tufts require a thicker application.

If desired, pile threads and pile loops may be bonded in the same operation as a nonwoven, a felt or a foam, each of which may consist of a multiplicity of different materials. If desired, the same coating system may be employed to also apply a heavy-duty coating material following the bonding of the pile threads and loops.

The coating composition rapidly solidifies on cooling to permit instant rollup after the unfinished carpet material has been coated.

The exclusive use of physically hardening raw materials in the coating composition used according to this invention distinctly facilitates the recycling of carpets, which may consist of polypropylene or polyamide for example. In the case of polypropylene carpet material, polymer-varietally pure recycling is possible.

Together with the energy savings over latex coating, the process of this invention can be considered an economically, environmentally and resource-conserving alternative to currently established processes.

The invention will now be more particularly described by way of example.

1. Preparation of Hotmelts 1.a. The following substances were melted together at 190° C. in an oil-heated stirred tank:

30 parts by weight of a substantially amorphous, propene-rich poly-α-olefin having a melt viscosity of 3,500 mPas/190° C. (VESTOPLAST® 704; 25° C. needle penetration of 24×0.1 mm; softening point 105° C.) and also 30 parts by weight of a substantially amorphous, butene-rich poly-α-olefin having a melt viscosity of 8,000 mPas/190° C. (VESTOPLAST® 408; 25° C. needle penetration of 4 0.1 mm; softening point 118° C.).

This was followed by the portioned addition of 30 parts by weight of an aliphatic hydrocarbon resin (ESCOREZ® 1102, viscosity 7,000 mPas/150° C.; softening point 100° C.) and 10 parts by weight of a polyethylene wax (VESTOWAX® A616).

The entire mixture was stirred at 180° C. for 1 hour until homogeneous.

The composition obtained had the following properties:

| | |
|---|---|
| Softening point, ring and ball: | 118° C. |
| Needle penetration 100/25/5: | 8–9 × 0.1 mm |
| Melt viscosity at 190° C. | 1,660 mPas. |

1.b. The following substances were mixed as under 1.a.:
30 parts by weight of VESTOPLAST® 704,
26 parts by weight of VESTOPLAST® 408, 30 parts by weight of an aliphatic hydrocarbon resin (ESCOREZ® 5300; viscosity 1,000 mPas/150° C.; softening point 105° C.), 4 parts by weight of a maleic anhydride modified polypropylene (EXXELOR® PO 1015) and also 10 parts of VESTOWAX® A616.

The composition obtained had the following properties:

| | |
|---|---|
| Softening point, ring and ball: | 134° C. |
| Needle penetration 100/25/5: | 8–9 × 0.1 mm |
| Melt viscosity at 190° C. | 2,410 mPas. |

2. Pile and Single Filament Bonding

Method A:

The tufted carpet used was composed of polyamide fiber material and had a woven polypropylene backing and a total weight of 600 g/m². To lock the pile tufts in the backing, the backside of the carpet was coated with the hotmelt described above.

The precoat material was applied to the backside of the carpet web by means of a hot knife doctor at 170° C. which cooperated with a heated roll. The melt temperature was 170° C., the coating rate 5 m/min and the coating weight 400 g/m².

Before and after coating, the carpet back passed through an infrared zone each time; in this zone, it was preheated to 120° C. The afterheating ensured that the applied coating was briefly kept liquid at 140° C. to improve penetration by the hotmelt.

Method B:

The procedure was as for method A except for the following differences:

The precoat material was applied through a wide slot die heated to 170° C. The coating rate was 10 m/min and the coating weight 340 g/m².

The carpet samples produced by both methods were tested on the lines of the Lisson treading wheel test (EN 1963). They were also measured for tuft bind. The results of these tests are reported in table 1.

TABLE 1

Testing of pile and single filament bonding using the hotmelts of 1.a. and 1.b.

| | Example | | | |
|---|---|---|---|---|
| | 1 | | 2 | |
| | 1.a. | | 1.b. | |
| Hotmelt as per | Method A | Method B | Method A | Method B |
| Tuft bind [kg] | 6.0 | 6.1 | 5.9 | 6.1 |
| Treading wheel test; visual evaluation[a] after treading frequencies of | | | | |
| 750 | ++ | ++ | ++ | ++ |
| 1 000 | ++ | ++ | ++ | ++ |
| 1 500 | +/++ | ++ | +/++ | ++ |
| 2 000 | +/++ | ++ | + | +/++ |

[a]Possible impairment of surface was evaluated, primarily the detachment of single filaments;
++ very good
+ good Method C:

The procedure was as for method B except for the following differences:

The tufted carpet used was composed of polypropylene fiber material and had a woven polypropylene backing and a total weight of 390 g/m².

The test results correspond to those of method B.

Method D:

Like method C except for the following changes:

The coating weight was 400 g/m². A secondary textile backing was laminated on after passage through the afterheating sector.

The test results correspond to those of method B.

German application 10228622.1 filed on Jun. 26, 2002, is incorporated herein by reference in its entirety.

Obviously, numerous modifications and variations of the present invention are possible in light of the above teachings. It is therefore to be understood that within the scope of the appended claims, the invention may be practiced otherwise than as specifically described herein.

What is claimed is:

1. A process for tuft and filament binding to an unfinished carpet to provide a coated carpet, which comprises
    applying a coating composition which comprises from 50% to 100% by weight of one or more substantially amorphous poly-α-olefins as a melt to the backside of the unfinished carpet in a coating weight amount of from 20 to 1,500 g/m² to bind the tuft and filament to the unfinished carpet,
    wherein the melt viscosity of the coating composition at 190° C. is from 200 mPas to 20,000 mPas, wherein the substantially amorphous poly-α-olefin comprises at least one selected from the group consisting of atactic poly-1-butene, propene-ethene copolymer, propene-1-butene copolymer, 1-butene-ethene copolymer and propene-1-butene-ethene terpolymer, and wherein the substantially amorphous poly-α-olefin has an enthalpy of fusion of at least 2 J/g and not more than 100 J/g.

2. The process according to claim 1, wherein the substantially amorphous poly-α-olefin comprises polymerized monomer units of
    from 0% to 100% by weight of one or more poly-α-olefins having 4 to 10 carbon atoms,
    from 0% to 100% by weight of propene, and
    from 0% to 20% by weight of ethene.

3. The process according to claim 1, wherein the substantially amorphous poly-α-olefin comprises polymerized monomer units of
    from 0% to 80% by weight of one or more poly-α-olefins having 4 to 10 carbon atoms,
    from 20% to 100% by weight of propene, and
    from 0% to 20% by weight of ethene.

4. The process according to claim 1, wherein the substantially amorphous poly-α-olefin has a softening point between 70 and 165° C., a melt viscosity between 2,000 and 200,000 mPas at 190° C., a density of less than 0.90 g/cm³ and a needle penetration between 3 and 50×0.1 mm.

5. The process according to claim 1, wherein the coating composition comprises from 60% to 98% by weight of the substantially amorphous poly-α-olefin.

6. The process according to claim 1, wherein the coating composition further comprises one or more of
    from 0% to 5% by weight of a crystalline polyolefin,
    from 0% to 40% by weight of a resin,
    from 0% to 35% by weight of fillers or pigments,
    from 0% to 10% by weight of a flame retardant other than magnesium hydroxide or aluminum hydroxide, or
    from 0% to 15% by weight of a wax.

7. The process according to claim 1, wherein the coating composition further comprises from 0% to 10% by weight of wax.

8. A process according to claim 1, wherein the coating composition further comprises from 0% to 7% by weight of wax.

9. A carpet produced by the process of claim 1.

10. The process according to claim 1, wherein the coating composition is applied at a temperature of from 100 to 190° C.

11. The process according to claim 1, wherein the coated carpet is cured without drying.

12. The process according to claim 1, wherein the coating composition hardens below 100° C.

13. The process according to claim 1, wherein the carpet comprises polypropylene.

14. The process according to claim 1, further comprising heating the carpet before applying the coating composition.

15. The process of claim 1, wherein the coating composition is maintained at a temperature above its melting point after application to the carpet.

16. The process according to claim 1, wherein the coating composition hardens without evaporation of a solvent.

17. The process according to claim 1, wherein the coating composition does not contain water.

18. The process according to claim 1, wherein the enthalpy of fusion is at least 4 J/g.

* * * * *